US012645045B2

(12) United States Patent
Kumar et al.

(10) Patent No.: US 12,645,045 B2
(45) Date of Patent: Jun. 2, 2026

(54) MICRO SHEATH BUFFER TUBE WITH ROLLABLE RIBBONS

(71) Applicant: Sterlite Technologies Limited, Gurgaon (IN)

(72) Inventors: Sravan Kumar, Aurangabad (IN); Kishore Sahoo, Aurangabad (IN)

( * ) Notice: Subject to any disclaimer, the term of this patent is extended or adjusted under 35 U.S.C. 154(b) by 0 days.

(21) Appl. No.: 18/487,478

(22) Filed: Oct. 16, 2023

(65) Prior Publication Data

US 2024/0053561 A1    Feb. 15, 2024

Related U.S. Application Data

(63) Continuation of application No. 17/042,694, filed on Sep. 28, 2020, now abandoned.

(51) Int. Cl.
*G02B 6/44* (2006.01)

(52) U.S. Cl.
CPC ........... *G02B 6/443* (2013.01); *G02B 6/4403* (2013.01); *G02B 6/441* (2013.01); *G02B 6/44384* (2023.05); *G02B 6/448* (2013.01)

(58) Field of Classification Search
CPC .............................. G02B 6/4403; G02B 6/448
See application file for complete search history.

(56) References Cited

U.S. PATENT DOCUMENTS

| | | | | |
|---|---|---|---|---|
| 6,377,738 B1 * | 4/2002 | Anderson | ............ | G02B 6/4433 |
| | | | | 385/100 |
| 6,749,446 B2 * | 6/2004 | Nechitailo | ........... | G02B 6/4429 |
| | | | | 439/114 |
| 8,577,196 B1 * | 11/2013 | McNutt | ................ | G02B 6/4435 |
| | | | | 385/109 |
| 8,639,075 B1 * | 1/2014 | Burnett | ................ | G02B 6/4431 |
| | | | | 385/100 |
| 10,107,980 B1 * | 10/2018 | Debban | ................ | G02B 6/4404 |
| 2007/0183726 A1 * | 8/2007 | Nothofer | .............. | G02B 6/4438 |
| | | | | 385/100 |
| 2011/0170836 A1 * | 7/2011 | Consonni | ............. | G02B 6/4402 |
| | | | | 385/102 |
| 2014/0199037 A1 * | 7/2014 | Hurley | ................. | G02B 6/4403 |
| | | | | 385/114 |
| 2019/0049681 A1 * | 2/2019 | Bookbinder | ......... | G02B 6/4478 |

* cited by examiner

*Primary Examiner* — Eric Wong
(74) *Attorney, Agent, or Firm* — Steven R. Fairchild

(57) ABSTRACT

The present disclosure provides a micro sheath buffer tube with rollable optical fiber ribbons for optical fiber cable to reduce the overall cable diameter. The buffer tube indicates one or more subunits, a micro sheath layer and a plurality of water swellable yarns. The one or more subunits encloses a plurality of optical fiber ribbons. Each optical fiber ribbon of the plurality of optical fiber ribbons includes 12 optical fibers. Further, each of a plurality of optical fibers is a colored optical fiber. In addition, the micro sheath layer surrounds the one or more subunits. Furthermore, the one or more subunits has a coating layer of low smoke zero halogen material.

7 Claims, 1 Drawing Sheet

100

100
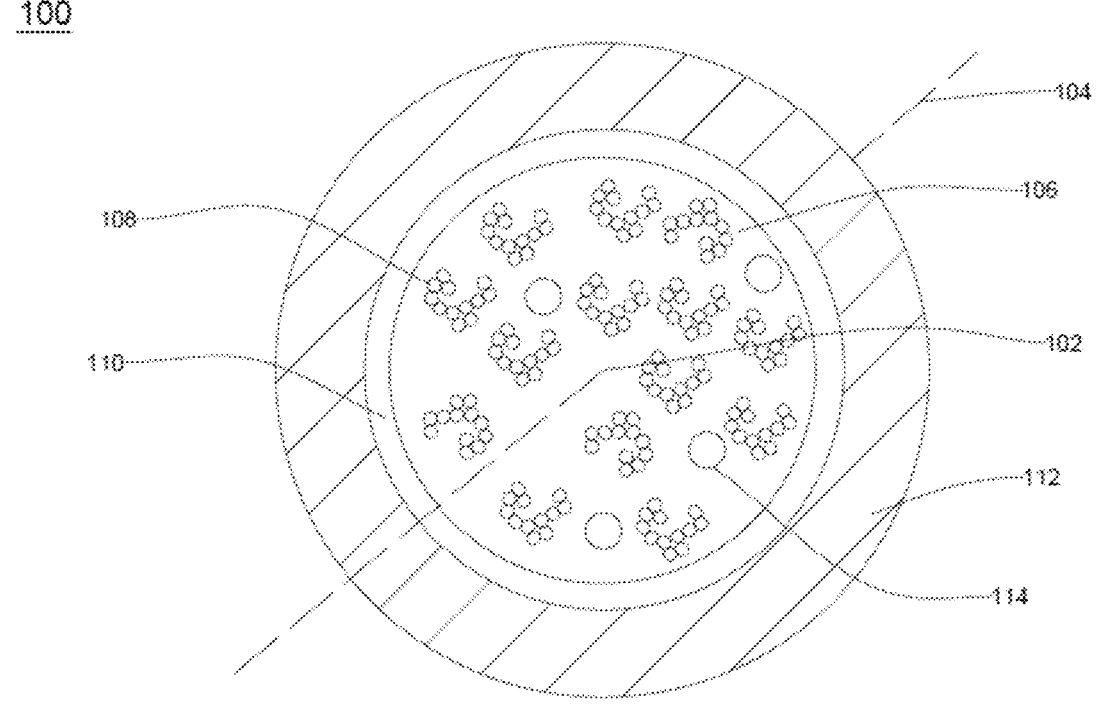

MICRO SHEATH BUFFER TUBE WITH ROLLABLE RIBBONS

CROSS REFERENCE TO RELATED APPLICATION

The present application is based on, and claims priority from an Indian Application Number 201811011820 filed on 29 Mar. 29, 2018, PCT application number PCT/IN2019/050261 filed on Mar. 29, 2019, and U.S. patent application Ser. No. 17/042,694, which published as US Patent Application Publication Number 20210055491 A1, the disclosure of which is hereby incorporated by reference herein.

COPYRIGHT STATEMENT

FIELD

The present disclosure relates to the field of fiber optics and, in particular, the present disclosure relates to a micro sheath buffer tube with rollable ribbons.

DESCRIPTION OF THE RELATED ART

Optical fiber cables typically include optical fibers or ribbons enclosed in buffer tubes. Conventionally, the optical fiber cables have loose fibers inside the buffer tube. The loose fibers inside the buffer tube require more time for the splicing of fibers which results in increase in the time of installation of the optical fiber cable. In addition, the prior art optical ribbon cables have multiple fibers in a single flat structured ribbon inside the buffer tube. This leads to a larger diameter of optical fiber ribbon cable in which the buffer tube is installed. Moreover, this leads to higher cable weight which further creates problem during manufacturing, transporting and installation.

In light of the foregoing discussion, there exists a need for micro sheath buffer tube with optical fiber ribbons which occupies less space and overcomes the above cited drawbacks.

BRIEF DESCRIPTION OF THE INVENTION

In an aspect, the present disclosure provides a buffer tube. The buffer tube includes one or more subunits. In addition, the buffer tube includes a micro sheath layer. Further, the one or more subunits encloses a plurality of optical fiber ribbons. Each optical fiber ribbon of the plurality of optical fiber ribbons is a rollable ribbon. Furthermore, each optical fiber ribbon of the plurality of optical fiber ribbons incudes a plurality of optical fibers. Moreover, the micro sheath layer surrounds the one or more subunits.

A primary objective of the disclosure is to provide a micro sheath buffer tube with rollable optical fiber ribbons.

Another object of the present disclosure is to provide the micro sheath buffer tube for optical fiber cable to reduce the overall cable diameter.

Yet another object of the present disclosure is to provide the micro sheath buffer tube that is easy to strip.

In an embodiment of the present disclosure, the buffer tube includes a plurality of water swellable yarns. The plurality of water swellable yarns is positioned along the plurality of optical fiber ribbons. In addition, the plurality of water swellable yarns prevent ingression of water inside the plurality of optical fiber ribbons.

In an embodiment of the present disclosure, the one or more subunits has a coating layer. The coating layer over the one or more subunits is a layer of low smoke zero halogen material. In addition, the coating layer over the one or more subunits provides flexibility and UV resistant properties to the one or more subunits. Further, the coating layer has thickness of about 0.1-0.2 millimeters. Furthermore, the coating layer has tolerance of about ±0.05 millimeters.

In an embodiment of the present disclosure, the one or more subunits includes the plurality of optical fiber ribbons in a range of about 1 to 36.

In an embodiment of the present disclosure, the one or more subunits includes the plurality of optical fibers in a range of about 12 to 432.

In an embodiment of the present disclosure, each of the plurality of optical fibers has diameter of about 180-200 micron.

In an embodiment of the present disclosure, each of the plurality of optical fibers is a colored optical fiber. In addition, color of each of the plurality of optical fibers is different.

In an embodiment of the present disclosure, each optical fiber ribbon of the plurality of optical fiber ribbons include 12 optical fibers. however number of optical fibers per ribbon may vary.

In an embodiment of the present disclosure, the plurality of optical fiber ribbons is differentiated by using a ring marking technique or by using colored binders.

DESCRIPTION OF THE DRAWINGS

In an embodiment of the present disclosure, the plurality of optical fiber ribbons is differentiated by using a ring marking technique or by using colored binders.

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which:

FIG. 1 illustrates a cross sectional view of a buffer tube, in accordance with an embodiment of the present disclosure.

It should be noted that the accompanying FIGURES are intended to present illustrations of few exemplary embodiments of the present disclosure. These FIGURES are not intended to limit the scope of the present disclosure. It should also be noted that accompanying FIGURES are not necessarily drawn to scale.

REFERENCE NUMERALS IN THE DRAWINGS

For a more complete understanding of the present invention parts, reference is now made to the following descriptions:

100. Buffer tube.
102. Geometrical center.
104. Longitudinal axis.

106. Plurality of optical fiber ribbons.

108. Plurality of optical fibers.

110. One or more subunits.

112. Micro sheath layer.

114. Plurality of water swellable yarns.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying FIGURES. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying FIGURES are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

According to FIG. 1, this is a cross sectional view of a buffer tube 100, in accordance with an embodiment of the present disclosure. In general, buffer tube is a tube for encapsulating number of optical fibers to provide mechanical isolation and physical damage protection to the number of optical fibers. In an embodiment of the present disclosure, the buffer tube 100 is a flexible module (A module is a tube or enclosure for housing a plurality of optical fibers/ribbons.

A flexible module is a module made of a material that has low Young's modulus and is easy to bend) used in any optical fiber cable to reduce the overall diameter of the particular optical fiber cable.

The buffer tube 100 is defined along a longitudinal axis 104 passing through a geometrical center 102 of the buffer tube 100. The longitudinal axis 104 of the buffer tube 100 is an imaginary axis along lengthwise direction of the buffer tube 100. The longitudinal axis 104 passes through the geometrical center 102 of the buffer tube 100. The geometrical center 102 of the buffer tube 100 is central point of the buffer tube 100. In other words, the geometrical center 102 of the buffer tube 100 is defined as a midpoint of diameter of the buffer tube 100. In an embodiment of the present disclosure, the buffer tube 100 is circular in shape. In another embodiment of the present disclosure, shape of the buffer tube 100 may vary.

The buffer tube 100 includes one or more subunits 110, a micro sheath layer 112 and a plurality of water swellable yarns 114. The one or more subunits 110 includes a plurality of optical fiber ribbons 106. In general, optical fiber ribbons are made of number of optical fibers bonded together.

In an embodiment of the present disclosure, each of the plurality of optical fiber ribbons 106 includes a plurality of optical fibers 108. In general, optical fiber is a thin strand of glass capable of transmitting optical signals. In an embodiment of the present discourse, each optical fiber of the plurality of optical fibers 108 has diameter of about 200 micron. In another embodiment of the present discourse, diameter of the plurality of optical fibers 108 may vary. In addition, each of the plurality of optical fibers 108 is a colored optical fiber. In an embodiment of the present disclosure, color of each optical fiber of the plurality of optical fibers 108 is different from each other. In an example, color of the plurality of optical fibers 108 is selected from a group. The group includes a plurality of colors for differentiation and identification of the plurality of optical fibers 108. The plurality of colors include red, orange, blue, green, black, grey, yellow and the like. In general, optical fibers are sandwiched, encapsulated, and/or edge bonded to form an optical fiber ribbon. In addition, the plurality of optical fibers 108 is used for transmitting information over long distances in the form of light pulses. Each of the plurality of optical fibers 108 is configured to transmit large amounts of information over long distances with relatively low attenuation and high bandwidth. Further, each of the plurality of optical fibers 108 includes a core region and a cladding region. In general, core region is an inner part of optical fiber and cladding section is an outer part of the optical fiber. The cladding region surrounds the core region.

In an embodiment of the present disclosure, each optical fiber ribbon of the plurality of optical fiber ribbons 106 is a rollable ribbon. In general, rollable ribbons are capable to roll along non-preferential axis. In addition, rollable ribbons are flexible. In general, flexibility may be referred to the ability of any material to undergo bending without any cracks or other failures when an external force is applied. The flexible and rollable nature of the plurality of optical fiber ribbons 106 facilitates in reducing splicing time for higher fiber counts. In general, the flexible nature of rollable ribbons facilitates in decreasing overall diameter of the optical fiber cable.

Further, each of the plurality of optical fiber ribbons 106 is a corrugated optical fiber ribbon. In an embodiment of the present disclosure, corrugation is on both sides of the plurality of optical fiber ribbons 106. In another embodiment of the present disclosure, corrugation is only on any one side of the plurality of optical fiber ribbons 106 and other side of the plurality of optical fiber ribbons 106 is flat. In general, corrugation is defined as grooving or folds on any surface. In addition, corrugation enables the plurality of optical fiber ribbons 106 to roll in a circular fashion. The rolling of the plurality of optical fiber ribbons 106 allows each optical fiber ribbon of the plurality of optical fiber ribbons 106 to consume less space when positioned inside the buffer tube 100.

In an embodiment of the present disclosure, the one or more subunits 110 has a coating layer. In addition, the one or more subunits 110 bind the plurality of optical fiber ribbons 106. In an embodiment of the present disclosure, the coating layer over the one or more subunits 110 is a layer of low smoke zero halogen material. In another embodiment of the present disclosure, the coating layer over the one or more subunits 110 is a layer of any suitable material. The coating layer over the one or more subunits 110 provides flexibility and UV resistant properties to the one or more subunits 110. Further, the coating layer over the one or more subunits 110 surrounds the plurality of optical fiber ribbons 106 for ease and faster termination. In an embodiment of the present disclosure, the coating layer over the one or more subunits 110 has thickness of about 0.2 millimeters. In another embodiment of the present disclosure, thickness of the coating layer over the one or more subunits 110 may vary. In an embodiment of the present disclosure, the coating layer over the one or more subunits 110 has tolerance of about ±0.05 millimeters. In another embodiment of the present disclosure, tolerance of the coating layer over the one or more subunits 110 may vary. The one or more subunits 110 are easy to peel due to presence of the coating layer. In addition, the one or more subunits 110 does not require any cutting tool for termination. The coating layer over the plurality of optical fiber ribbons 106 makes the one or more subunits 110 easy to peel. In addition, the one or more subunits 110 are finger strippable.

In an embodiment of the present disclosure, the one or more subunits 110 include a single (one) optical fiber ribbon. In addition, the single optical fiber ribbon includes 12 optical fibers. Further, the one or more subunits 110 include 12 optical fibers (1*12=12). Furthermore, the one or more subunits 110 with the coating layer has diameter in a range of about 1.45 to 1.6 millimetres.

In another embodiment of the present disclosure, the one or more subunits 110 includes two optical fiber ribbons. In addition, each of the two optical fiber ribbon includes 12 optical fibers. Further, the one or more subunits 110 include 24 optical fibers (2*12=12). Furthermore, the one or more subunits 110 with the coating layer has diameter in the range of about 2.45 to 2.75 millimetres.

In yet another embodiment of the present disclosure, the one or more subunits 110 includes four optical fiber ribbons. In addition, each of the four optical fiber ribbon includes 12 fibers. Further, the one or more subunits 110 include 48 fibers (4*12=12). Furthermore, the one or more subunits 110 with the coating layer has diameter in the range of about 2.85 to 3.2 millimetres.

In yet another embodiment of the present disclosure, the subunit 110 includes six optical fiber ribbons. In addition, each of the six optical fiber ribbons includes 12 fibers. Further, the one or more subunits 110 include 72 fibers (6*12=72). Furthermore, the one or more subunits 110 with the coating layer has diameter in the range of about 3.45 to 3.9 millimetres.

In yet another embodiment of the present disclosure, the one or more subunits 110 includes eight optical fiber ribbons. In addition, each of the eight optical fiber ribbon includes 12 fibers. Further, the one or more subunits 110 include 96 fibers (8*12=96). Furthermore, the one or more subunits 110 with the coating layer has diameter in the range of about 3.7 to 4.2 millimetres.

In yet another embodiment of the present disclosure, the one or more subunits 110 includes twelve optical fiber ribbons. In addition, each of the twelve optical fiber ribbon includes 12 fibers. Further, the one or more subunits 110 include 144 fibers (12*12=144). Furthermore, the one or more subunits 110 with the coating layer has diameter in the range of about 4.45 to 5.05 millimetres.

In yet another embodiment of the present disclosure, the one or more subunits 110 include sixteen optical fiber ribbons. In addition, each of the sixteen optical fiber ribbon includes 12 fibers. Further, the one or more subunits 110 include 192 fibers (16*12=192). Furthermore, the one or more subunits 110 with the coating layer has diameter in the range of about 5.05 to 5.75 millimetres.

In yet another embodiment of the present disclosure, the one or more subunits 110 include eighteen optical fiber ribbons. In addition, each of the eighteen optical fiber ribbon includes 12 fibers. Further, the one or more subunits 110 include 216 fibers (18*12=216). Furthermore, the one or more subunits 110 with the coating layer has diameter in the range of about 5.35 to 6.1 millimetres.

In yet another embodiment of the present disclosure, the one or more subunits 110 include twenty four optical fiber ribbons. In addition, each of the twenty four optical fiber ribbon includes 12 fibers. Further, the one or more subunits 110 include 288 fibers (24*12=288). Furthermore, the one or more subunits 110 with the coating layer has diameter in the range of about 6.1 to 6.95 millimetres.

In yet another embodiment of the present disclosure, the one or more subunits 110 include thirty two optical fiber ribbons. In addition, each of the thirty two optical fiber ribbons includes 12 fibers. Further, the one or more subunits 110 include 384 fibers (32*12=384). Furthermore, the one or more subunits 110 with the coating layer has diameter in the range of about 7.0 to 7.95 millimetres.

In yet another embodiment of the present disclosure, the one or more subunits 110 include thirty six optical fiber ribbons. In addition, each of the thirty six optical fiber ribbon includes 12 fibers. Further, the one or more subunits 110 include 432 fibers (36*12=432). Furthermore, the one or more subunits 110 with the coating layer has diameter in the range of about 7.4 to 8.4 millimetres.

In yet another embodiment of the present disclosure, the one or more subunits 110 include optical fibers in a range of about 12 fibers to 432 fibers. In addition, the one or more subunits 110 include optical fiber ribbons in a range of about 1 to 36. Further, diameter of the one or more subunits 110 with the coating layer may vary according to the number of optical fiber ribbons.

In an embodiment of the present disclosure, the plurality of optical fiber ribbons 106 is separated through colored binders when the number of optical fiber ribbons is more than a predefined value inside the one or more subunits 110. In an example, the predefined value includes 36 optical fiber ribbons. In another example, the predefined value may vary according to the requirement.

In another embodiment of the present disclosure, each of the plurality of optical fiber ribbons 106 is distinguishable with each other through a ring marking technique. The ring marking technique is used for spraying all kinds of colored ring on surface of the plurality of optical fiber ribbons 106. In addition, the ring marking technique is convenient for the differentiation and identification of specific optical fiber ribbons from the plurality of optical fiber ribbons 106.

In an example, the one or more subunits 110 of the buffer tube 100 includes 12 optical fiber ribbons. Each of the 12 optical fiber ribbons are rollable ribbons. The ring marking technique is used for the marking of the 12 optical fiber ribbons. A single ring with 'w' width is marked over first optical fiber ribbon. In addition, two rings with 'w' width are marked over second optical fiber ribbon. Further, three rings with 'w' width are marked over third optical fiber ribbon. Furthermore, four rings with 'w' width are marked over fourth optical fiber ribbon. Moreover, one ring with '3w' width is marked over fifth optical fiber ribbon. Also, two rings with '3w' width are marked over sixth optical fiber ribbon. Also, three rings with '3w' width are marked over seventh optical fiber ribbon. Also, four rings with '3w' width are marked over eighth optical fiber ribbon. Also, one ring with '3w' width and one ring with 'w' width are marked over ninth optical fiber ribbon. The two rings with width 'w' & '3w' are adjacent to each other on ninth optical fiber ribbon. The two rings with width 'w' & '3w' are considered as one set of rings. Also, two such sets of rings as described above are marked adjacent to each other over tenth optical fiber ribbon. Also, three such sets of rings as described above are marked in an adjacent manner over eleventh optical fiber ribbon. Also, four such sets of rings as described above are marked in an adjacent manner over twelfth optical fiber ribbon. In an embodiment of the present disclosure, the ring mark technique is suitable when the one or more subunits 110 includes at most 12 optical fiber ribbons.

The buffer tube 100 includes the micro sheath layer 112. The micro sheath layer 112 encapsulates the one or more subunits 110. In addition, the micro sheath layer 112 protects the one or more subunits 110. Further, the micro sheath layer 112 is the outermost layer of the buffer tube 100. In an embodiment of the present disclosure, the micro sheath layer 112 is made of Low smoke Zero halogen (LSZH) material. In another embodiment of the present disclosure, the micro sheath layer is made of any suitable material.

The buffer tube 100 includes the plurality of water swellable yarns 114. The plurality of water swellable yarns 114 is positioned along the plurality of optical fiber ribbons 106. The WSYs can be present longitudinal or helically wrapped around the one or more ribbons. The plurality of water swellable yarns 114 prevents ingression of water inside the one or more subunits 110. In an embodiment of the present disclosure, number of the plurality of water swellable yarns 114 in the one or more subunits 110 are fixed. In another embodiment of the present disclosure, number of the plurality of water swellable yarns 114 in the one or more subunits 110 may vary according to the number of the plurality of optical fiber ribbons 106.

Each of the plurality of optical fiber ribbons 106 has the ability of mass fusion splicing. In general, fusion splicing is the phenomenon of joining ends of two optical fibers using heat. The joint of the two optical fibers prevents the scattering of light from the splice when the light travels through the two optical fibers. In general, process of fusion splicing involves use of heat to melt the ends of the two optical fibers for joining together. In an example, the process of fusion splicing involves four steps. The four steps include stripping of a fiber, cleaning of the fiber, cleaving of the fiber followed with splicing of the fiber. In addition, the plurality of optical fiber ribbons 106 is compatible for fusion with conventional optical fiber ribbon with 250 micron optical fibers.

The present disclosure provides numerous advantages over the prior art. The present disclosure provides the buffer tube with the plurality of optical fiber ribbons. In addition, the optical fiber ribbon disclosed above is compatible for fusion with the conventional optical fiber ribbon with 250 microns optical fibers. Further, the optical fiber ribbon as disclosed above can be rolled into a circular shape which reduces overall cable diameter in which it is installed. Furthermore, the rolled optical fiber ribbon as disclosed above has the small dimension which reduces the overall weight of the cable in which the above disclosed optical fiber ribbon is used. Moreover, the one or more subunits as disclosed above are easy finger strippable or easy strippable and do not require any ripcord or cutting tools. The subunit can be made of a material that does not require any ripcord or cutting tool for termination and can easily be torn by the force of hand by an average adult.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

We claim:

1. An optical fiber cable comprising:
   one or more flexible modules such that each module encloses a plurality of optical fiber ribbons, where each optical fiber ribbon is a rollable optical fiber ribbon, wherein each rollable optical fiber ribbon has a plurality of optical fibers such that adjacent optical fiber are bonded, where at least one pair of adjacent fibers are bonded intermittently along length of the adjacent fibers;
   wherein the one or more flexible modules have a young's modulus of <500 MPa,
   wherein each of the plurality of optical fibers has diameter in the range 180-200 micron
   wherein the one or more flexible modules is made of low smoke zero halogen material and an outer sheath layer surrounding the one or more flexible modules.

2. The optical fiber cable of claim 1 further comprising one or more water blocking component wrapped around the one or more flexible modules.

3. The optical fiber cable of claim 1 further comprising one or more water blocking component, where the one or more water blocking component in the one or one flexible modules, where the one or more water blocking component are wrapped around the plurality of optical fiber ribbons.

4. The optical fiber cable of claim 1 further comprising one or more water blocking component, where the one or more water blocking component in the one or one flexible modules, where the one or more water blocking component are placed along the plurality of optical fiber ribbons.

5. The optical fiber cable of claim 4, where the one or more water blocking component is one or more water swellable yarns when the one or more water blocking component is in the one or more flexible modules, or one or more water blocking tape when the one or more water blocking component is outside the one or more flexible modules.

6. The optical fiber cable of claim 1 further comprising one or more tensile elements in between the outer sheath and the one or more flexible modules, where the one or more tensile elements are flexible.

7. The optical fiber cable of claim 1 further comprising one or more strength members embedded in the outer sheath of the cable.

\* \* \* \* \*